UNITED STATES PATENT OFFICE.

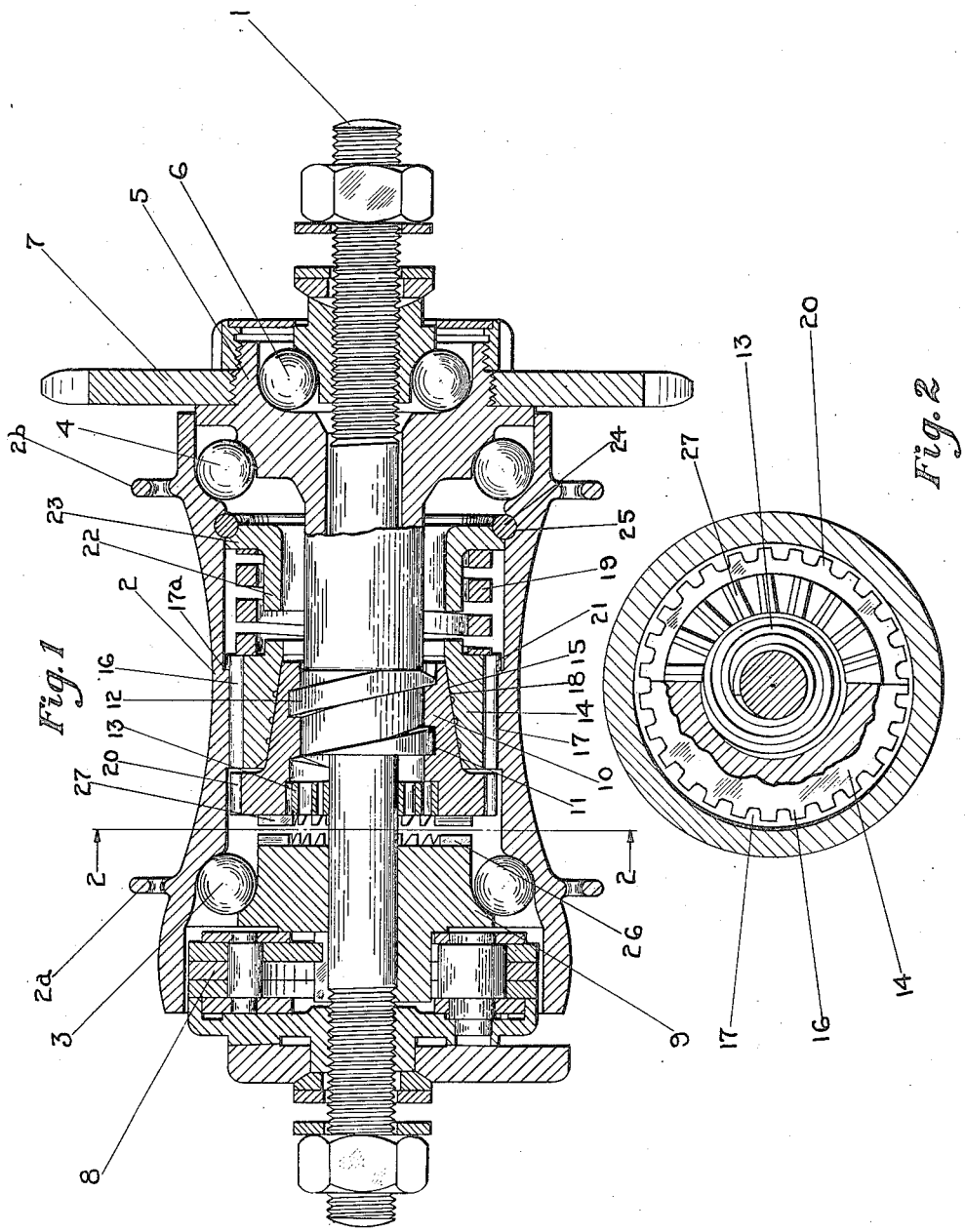

VICTOR W. PAGÉ, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

CLUTCH MECHANISM.

1,376,033.

Specification of Letters Patent.  Patented Apr. 26, 1921.

Application filed May 22, 1915, Serial No. 29,893. Renewed July 13, 1917. Serial No. 180,484.

*To all whom it may concern:*

Be it known that I, VICTOR W. PAGÉ, a citizen of the United States, residing at Bristol, county of Hartford, State of Connecticut, have invented a certain new and useful Clutch Mechanism, of which the following is a full, clear, and exact description, such as will enable others skilled in the art to which it appertains to make and use the same, reference being had to the accompanying drawings, forming part of this specification.

My invention relates to clutch mechanisms and more particularly to a clutch mechanism adapted for use in coaster brakes, for example.

In coaster brakes broadly of the type disclosed in U. S. Patent 850,077 to H. P. Townsend, granted April 9, 1907, and having a laterally shiftable connector or clutch sleeve therein which in one position clutches the hub shell to drive, in another position clutches the brake mechanism for braking, and in an intermediate position permits the hub shell to run free for coasting, it has been customary to provide either a simple non-positive taper clutch between the clutch sleeve and the hub shell or to provide a simple toothed positive clutch between those parts. A difficulty with a simple taper clutch has been its liability to slip, particularly under heavy pedal pressure, while a difficulty with the toothed clutch has been its abrupt and sudden clutching action and its liability to click when coasting. I have devised a coaster brake whose clutching mechanism possesses the smooth action of the taper type without its disadvantages and also possesses the positive action of the toothed type without its disadvantages.

One object of my invention is to provide a clutch mechanism whose clutching action is smooth and gradual as of the non-positive type and yet positive as of the positive type.

Another object of my invention is to provide a coaster brake in which the clutching action between the clutch sleeve and the hub shell is smooth and gradual as of the non-positive type and yet positive as of the positive type.

To these ends and also to improve generally upon devices of the character indicated, my invention consists in the various matters hereinafter described and claimed.

In the accompanying drawings:

Figure 1 is a longitudinal diametrical cross-sectional view of a coaster brake embodying my invention; and Fig. 2 is a cross-sectional view substantially on the line 2—2 of Fig. 1, a part of the clutch sleeve being broken away the better to show the end of the sliding-taper-block.

Although I have more particularly described and illustrated my invention as embodied in a coaster brake it will be understood that I do not restrict my invention to such devices.

Referring now to the drawings, 1 indicates the axle of the driving or traction wheel of a bicycle, which axle is adapted to be mounted in the frame of such bicycle, 2 indicates the hub shell of such wheel provided with the usual spoke flanges $2^a$ and $2^b$ and being mounted for rotation about said axle 1 as upon the ball bearings 3 and 4, 5 indicates the driver sleeve rotatably carried upon the axle 1 by the ball bearing 6 and carrying the sprocket 7 for connection with the usual pedal chain (not shown), 8 indicates the brake of any suitable construction, being shown of the general type shown and described in U. S. Patent 745,524, granted December 1, 1903, to Albert F. Rockwell, 9 indicates the brake actuator rockably mounted upon the axle 1 and which when rocked backwardly actuates the brake, 10 indicates the clutch sleeve carried upon the driver sleeve 5 for travel longitudinally thereof, such travel being effected by the intermeshing screw threads 11 of the clutch sleeve and 12 of the driver sleeve, and 13 indicates the "lag-spring" sprung upon the axle and expanding against the interior of the clutch sleeve and employed to counteract any possible tendency of the clutch sleeve when in non-clutching position to rotate with the driver sleeve instead of longitudinally traveling, all as thus far described being, except for the peculiar characters of the clutch sleeve and of the interior of the hub shell, of course well understood in the art. As more fully described hereinafter proper clutching structures are provided whereby when the clutch sleeve is at the right (as here illustrated) a driving connection is established with the hub shell, when it is in intermediate position the hub is free to coast, and when it is at the extreme left it is in position to rock the brake actuator.

Thus, in the structure as thus far described and assuming proper clutching structures between the clutch sleeve and the hub shell and between the clutch sleeve and the brake actuator, it will be apparent and as well understood in the art, that when the sprocket 7 is driven forwardly by ordinary forward pedaling it rotates the driver sleeve forwardly and thus causes the said clutch sleeve 10 to travel to the right until it comes into driving relation with the hub shell 2; whereupon continued forward rotation of the sprocket, the driver sleeve and the clutch sleeve causes the hub and bicycle to be propelled; when the rider holds his feet stationary the rotating hub shell causes the connector or clutch sleeve 10 to move to the left (on the threads of the driver sleeve) until the before mentioned driving relation between the clutch sleeve and the hub shell is broken, whereupon the hub shell 2 is free to coast; and when the driver sleeve 5 is rocked backwardly, as by backward rocking of the pedals, said clutch sleeve 10 is shifted to the left into clutching engagement with the brake actuator 9, whereupon further backward rocking of the driver sleeve also rocks the brake actuator backwardly and the brake is applied.

In carrying out my invention, and more particularly in applying it to coaster brakes, a sliding-taper-block or clutch element 14 preferably in the character of an annular sleeve provided with a taper 15 is received within the hub shell 2 and is slidable longitudinally thereof but non-rotatable with respect thereto. This slidable and non-rotatable connection may be effected by providing the exterior periphery of the block 14 with a suitable number, as an annular series, of peripheral teeth, ribs or splines 16 and by providing the hub shell with a corresponding and meshing series of teeth or ribs 17.

The clutch sleeve or clutch element 10 is provided with a taper 18 for clutching coöperation with the taper of the sliding-taper-block 14. Means, as the expanding spring 19 having its end in engagement with the block 14, are provided for forcing the block 14 in such a direction, as to the left in the drawings, as to resist to a desired degree the action of the clutch sleeve tending to slide the block in the direction, as to the right in the drawings, in which the clutch sleeve moves when moving into clutching engagement with the sliding block.

With the arrangement just above described it will be seen that when the clutch sleeve tends to move into clutching engagement with the sliding block the tendency of the sliding block to correspondingly move is resisted to a certain extent by the spring, and, in consequence, the driving tendency of the clutch sleeve (rotating with the driver sleeve) is transmitted to the hub shell and driving of the hub shell brought about.

At least one tooth or rib 20, and preferably an annular series of such teeth, is carried upon the clutch sleeve in position to at times engage between teeth, as the before referred to teeth 17, on the hub shell. These teeth 20 are, as shown, so located, as in rear, longitudinally of the axle, of the teeth of the hub shell, as to be out of engagement with the hub shell teeth when the sliding-taper-block is in left-hand position, but are yet so located as to be brought into engagement with the hub shell teeth when the sliding-taper-block is moved sufficiently to the right against the pressure of the spring. It is evident that when the teeth 20 are engaged with the teeth 17 a positive, non-slipping toothed driving clutch is established between the clutch sleeve 10 and the hub shell.

The strength of the spring 19 is preferably such that when the rider pedals easily, as when just starting, the tendency of the sliding-taper-block to slide to the right is completely resisted but when the rider increases his pedal pressure above an amount predetermined by the strength of the spring the sliding-taper-block, while still transmitting the driving force, will overcome the resistance of the spring 19 and move to the right and when registering of the teeth 17 and 20 occurs (as through a slight slip between the tapers brought about by the increased driving force) the teeth 20 will slide between the teeth 17 and a positive drive be effected.

Thus, with the structure above described, when the rider starts to forward pedal a gradual, easy and smooth "picking up" of the hub occurs due to the taper clutch; as he increases his pressure the adhesion of the two tapers is sufficient to prevent material slipping but yet the sliding block is shifting to the right and when the proper registration of the teeth 17 and 20 occurs and pressure is further increased the spring is further contracted and engagement of the teeth 17 and 20 occurs whereby the rider has arrived at a positive (toothed) clutching engagement in his hub without click and abruptness and yet gradually and smoothly and without appreciable slip.

Of course when the rider reduces his pedal pressure the spring 19 forces the sliding-taper-block and the clutch sleeve to the left and breaks the positive clutching engagement.

In order that the sliding-taper-block will not follow the clutch sleeve during the entire travel of the sleeve to the left (which action might interfere with coasting) I provide the block with some species of stop means. For example, I may make the right hand ends of the ribs 16 of the sliding block of a greater height than the main portions of the ribs, as indicated at 21, whereby such ends will abut the hub shell below the bases of the ribs 17 as upon the shoulder 17ª. As here shown this shoulder is so located as to so limit the left hand travel of the sliding block as to allow the clutch sleeve's taper 18 to stand free of the taper 15 of the block and at the same time permit the clutch sleeve to be out of engagement with the brake actuator.

The resilient abutment or spring 19 may be mounted in the hub shell in any suitable manner. As illustrated a sleeve 22 provides a flange 23 against which the spring abuts, the sleeve (and flange) being fixed against sliding relatively to the hub shell by the spring ring 24 sprung into the recess 25 in the interior surface of the hub shell.

Any suitable clutching connection between the brake actuator 9 and the clutch sleeve 10 may be provided. The illustrated structure comprises a circular series of teeth 26 upon the brake actuator and adapted for engagement with the circular series of teeth 27 on the end face of the clutch sleeve 10 whereby a positive clutching connection between the brake actuator and the clutch sleeve is provided.

While I have shown and described the parts 9, 10, 2, and 14 as provided each with a considerable number of teeth it will of course be understood that it is necessary to provide only such a number as will insure proper working though I find a large number preferable for the sake of safety and of smooth operation.

It will be seen that I have provided a clutching mechanism whose clutching action is smooth and gradual as of a taper clutch and is yet positive as of a toothed clutch and one which is simple, comparatively inexpensive to manufacture and particularly well adapted for use in coaster brakes.

Having thus described my invention, what I claim as new and desire to secure by Letters Patent is:

1. In a device of the character indicated, a driving member, a driven member, two clutches between said members, and means whereby upon actuation of said driving member in its driving direction one of said clutches is rendered effective and upon further actuation of said driving member in the same direction as before the other said clutch is rendered effective and continues so through successive cycles of operation of said driving member; substantially as described.

2. In a device of the character indicated, a driving member, a driven member, a non-positive clutch between said members, a positive clutch also between said members, and means whereby upon actuation of said driving member in its driving direction said non-positive clutch is rendered effective and upon further such actuation of said driving member said positive clutch is rendered effective and continues so through successive cycles of operation of said driving member; substantially as described.

3. In a device of the character indicated, a driving member, a driven member having provision for operative connection with the hereinafter mentioned clutches, two clutches movable into and out of such operative connection with said driven member, and operative connection between said driving member and said clutches for successivly moving them into such operative connection upon driving movement of said driving member; substantially as described.

4. In a device of the character indicated, a driving member, a driven member having provision for operative connection with the hereinafter mentioned clutches, a laterally movable connector having clutches arranged one behind the other in the direction of such lateral movement and different distances in such direction from the respective coöperating elements of said driven member, and means for moving said connector laterally upon driving movement of said driving member, whereby said clutches are successively moved into operative connection with said driven member; substantially as described.

5. In a device of the character indicated, driving and driven members, means for effecting a preliminary clutching between said members, means whereby said means for preliminary clutching is changed from non-clutching to clutching position through the instrumentality of one of said members, and means for then effecting a further clutching between said members; substantially as described.

6. In a device of the character indicated, a driver, an element to be clutched thereto, a movable clutch member having provision to clutch said element to be clutched, and a yieldable stop in holding connection with such element and in position to be engaged by said movable clutch member before the latter comes into clutching engagement with said element to be clutched, said movable clutch member having provision for clutching said yieldable stop, and operative connection between said driver and said movable clutch member for moving the latter into clutching position; substantially as described.

7. In a device of the character indicated, a driver, an element to be clutched thereto and provided with a clutch portion, a yieldable stop in holding connection with said element to be clutched and having a tapering clutch portion, a movable clutch member provided with a clutch portion complementary to the said clutch portion of said element to be clutched and also provided with a tapering clutch portion complementary to said clutch portion of said stop, said stop being in position to have its clutch portion engaged by said tapering clutch portion of said movable clutch member before the other said clutch portion of the latter engages its said complementary clutch portion, and a threaded driving connection between said driver and said movable clutch member; substantially as described.

8. In a device of the character indicated, an element to be clutched and provided with a toothed portion, a movable stop having a complementary toothed portion engaging and movable on said first mentioned toothed portion, said stop being provided with a clutch portion, and a movable clutch member provided with a clutch portion complementary to said clutch portion of said stop and also provided with a toothed portion complementary to said toothed portion of said element to be clutched; substantially as described.

9. In a cycle hub, an axle, a driver and a hub shell to be driven by said driver, both rotatable about said axle, a movable clutch member having provision to positively clutch said hub shell, a yieldable stop in holding connection with said hub shell and in position to be engaged by said movable clutch member before the latter comes into engagement with said hub shell, and operative driving connection between said driver and said movable clutch member; substantially as described.

10. In a cycle hub, an axle, a driver and a hub shell to be driven by said driver, both rotatable about said axle, a movable clutch member having provision to positively clutch said hub shell, a yieldable stop in holding connection with said hub shell and in position to be engaged by said movable clutch member before the latter comes into engagement with said hub shell, said movable clutch member having provision for non-positively clutching said yieldable stop, and an operative driving connection between said driver and said movable clutch member; substantially as described.

11. In a device of the character indicated, an axle, a hub shell and a driver sleeve for said shell carried by said axle for independent rotation, said sleeve being received within said shell, elements received within said shell for providing a positive and a non-positive clutch between said sleeve and shell, and means also received within said shell and whereby said non-positive clutch initially connects said sleeve and shell and whereby said positive clutch eventually connects said sleeve and shell; substantially as described.

12. In a device of the character indicated, an axle, a hub shell and a threaded driver sleeve for said shell carried for independent rotation upon said axle, said driver sleeve extending within said shell and said shell carrying clutch teeth, a tapered clutch sleeve carried within the shell and upon said driver sleeve and having threads coöperating with the threads of said driver sleeve, a sliding block splined to said hub shell upon the interior thereof and having a tapered portion for coöperation with the tapered portion of said clutch sleeve to provide a taper clutch between said shell and said clutch sleeve, and means received within said shell and coöperating with said sliding block to initially prevent its sliding under the thrust of said clutch sleeve when said tapers are brought into contact by rotation of said driver sleeve but eventually yieldable to permit sliding, said clutch sleeve being provided with clutch teeth for coöperation with the teeth of said shell but spaced therefrom when said sliding block is prevented from sliding but in position to be brought into engagement with the teeth of said shell when said sliding block eventually shifts; substantially as described.

13. In a device of the character indicated, an axle, a hub shell and a threaded driver sleeve for said shell carried upon said axle for independent rotation, said driver sleeve extending within said shell and said shell being provided with longitudinally extending projecting ribs upon its interior and of less length than said shell, a sliding block having ribs received between the ribs of said shell and provided with a taper, a clutch sleeve carried within such shell and having threads coöperating with the threads of said driver sleeve, such clutch sleeve having a taper for coöperation with said first named taper to provide a taper clutch between said shell and said clutch sleeve and also having clutch teeth in rear, longitudinally of said axle, of said taper and projecting into the plane of said ribs of said shell but normally in rear, longitudinally of said axle, of such ribs, and means received within said shell and coöperating with said sliding block to initially prevent its sliding under the thrust of the clutch sleeve when such clutch sleeve travels longitudinally of such axle during rotation of said driver sleeve and said tapers are brought into contact, but eventually yieldable to permit sliding, whereby said taper clutch is initially brought into operation but eventually said means yields and said block slides and the teeth of said clutch sleeve pass into engagement with the ribs of said shell to provide a positive clutch between said shell and said driver sleeve; substantially as described.

14. In a device of the character indicated, a hub shell interiorly provided with a positive clutch device, a driver sleeve for said shell received therein, a clutch sleeve received in said shell in sliding and driven relation with said driver sleeve and carrying a positive clutch device for coöperation with the device of said shell and also carrying a non-positive clutch device, a clutch block in non-rotatable and slidable relation with said shell and carrying a non-positive clutch device for coöperation with said first named non-positive clutch device, the characters of the non-positive clutch devices being such that when driving force is being transmitted from the one to the other the clutch sleeve tends to slide said clutch block, and means for initially preventing the sliding of said block but yieldable under the driving force to permit sliding, said positive clutch devices and said non-positive clutch devices being so spaced in the direction of said sliding that when said non-positive clutch devices are engaged and said means is preventing sliding of said block said positive clutch devices are unengaged and when said means yields under the tendency of the driving force to slide said block and said block slides said positive clutch devices are brought into engagement; substantially as described.

15. In a device of the character indicated, a hub shell interiorly provided with clutch teeth, a driver sleeve for said hub shell received therein, a clutch sleeve received in said shell in sliding and driven relation with said driver sleeve and carrying clutch teeth for coöperation with the teeth of said shell and also carrying a clutch taper, a clutch block in non-rotatable and slidable relation with said shell and carrying a clutch taper for coöperation with said first named taper, and means for initially preventing the sliding of said block but yieldable to permit sliding under a sufficient driving force, said tapers and said teeth being so spaced in the direction of said sliding that when said tapers are engaged and said means is preventing sliding of said block said teeth are unengaged and when said means yields under the driving force between said tapers and said block slides said teeth are brought into engagement; substantially as described.

16. In a device of the character indicated, a driving member and a driven member, a positive clutch mechanism and a non-positive clutch mechanism between said members, and means whereby said non-positive clutch mechanism connects said members below a predetermined driving force and whereby said positive clutch mechanism is positively moved into effective connection when said predetermined force is exceeded; substantially as described.

17. In a device of the character indicated, a driving member and a driven member, a toothed clutch and a taper clutch between said members, and means whereby said taper clutch connects said members below a predetermined driving force and whereby said toothed clutch connects said members when said predetermined force is exceeded; substantially as described.

18. In a device of the character indicated, an axle, a hub shell and a driver sleeve for said shell carried by said axle for independent rotation, said sleeve being received within said shell, elements received within said shell for providing a positive and a non-positive clutch between said sleeve and shell, and means also received within said shell and whereby said non-positive clutch connects said sleeve and shell below a predetermined driving force and whereby said positive clutch connects said sleeve and shell when said predetermined force is exceeded; substantially as described.

19. In a device of the character indicated, an axle, a hub shell and driver sleeve for said shell carried by said axle for independent rotation, said sleeve being received within said shell, a clutch sleeve carried upon said driver sleeve, there being means connecting said sleeves whereby when said driver sleeve is rotated said clutch sleeve is shifted longitudinally of said axle, said clutch sleeve carrying positive and non-positive clutch devices and said shell being provided with coöperating clutch devices, said devices being arranged to be brought into engagement during shifting of said clutch sleeve, and means whereby when said clutch sleeve is initially shifted said non-positive clutch devices are brought into engagement and whereby when said clutch sleeve is further shifted said positive clutch devices are brought into operation; substantially as described.

20. In a device of the character indicated, an axle, a hub shell and a threaded driver sleeve for said shell carried for independent rotation upon said axle, said driver sleeve extending within said shell and said shell carrying clutch teeth, a tapered clutch sleeve carried within the shell and upon said driver sleeve and having threads coöperating with the threads of said driver sleeve, a sliding block splined to said hub shell upon the interior thereof and having a tapered portion for coöperation with the tapered portion of said clutch sleeve to provide a taper clutch between said shell and said clutch sleeve, and means received within said shell and coöperating with said sliding block to prevent its sliding under less than a predetermined thrust of said clutch sleeve when said tapers are brought into contact by rotation of said driver sleeve but yieldable to permit sliding when such thrust is exceeded, said clutch sleeve being provided with clutch teeth for coöperation with the teeth of said shell and normally spaced from the teeth of said shell when said sliding block is prevented from sliding but in position to be brought into engagement with the teeth of said shell when said predetermined thrust is exceeded and said sliding block shifts; substantially as described.

21. In a device of the character indicated, an axle, a hub shell and a threaded driver sleeve for said shell carried upon said axle for independent rotation, said driver sleeve extending within said shell and said shell being provided with longitudinally extending projecting ribs upon its interior of less length than said shell, a sliding block having ribs received between the ribs of said shell and provided with a taper, a clutch sleeve carried within said shell and having threads coöperating with the threads of said driver sleeve, such clutch sleeve having a taper for coöperation with said first named taper to provide a taper clutch between said shell and said clutch sleeve and also having clutch teeth in rear, longitudinally of said axle, of said taper and projecting into the plane of said ribs of said shell but normally in rear, longitudinally of said axle, of such ribs, and means received within said shell and coöperating with said sliding block to prevent its sliding under less than a predetermined thrust of said clutch sleeve when said clutch sleeve travels longitudinally of said axle during rotation of said driver sleeve and said tapers are brought into contact, but yieldable to permit sliding when such thrust is exceeded, whereby said taper clutch is first brought into operation and when said predetermined thrust is exceeded said means yields and said block slides and the teeth of said clutch sleeve pass into engagement with the ribs of said shell to provide a positive clutch between said shell and said driver sleeve; substantially as described.

22. In a device of the character indicated, a driven member carrying a positive clutch device, a driver member for said driven member, a clutch element in sliding and driven relation with said driver member and carrying a positive clutch device for coöperation with the device of said driven member and also carrying a non-positive-clutch device, a clutch element in non-rotatable and slidable relation with said driven member and carrying a non-positive clutch device for coöperation with said first named non-positive clutch device, the characters of said non-positive clutch devices being such that when driving force is being transmitted from the one to the other the first named clutch element tends to slide said second named clutch element, and means for normally preventing the sliding of said second named clutch element and yieldable under a predetermined driving force to permit sliding, said positive clutch devices and said non-positive clutch devices being so spaced in the direction of said sliding that when said non-positive clutch devices are engaged and said means is preventing sliding of said second named clutch element said positive clutch devices are unengaged and when said means yields under the tendency of the driving force to slide said second named clutch element and such element slides said positive clutch devices are brought into engagement; substantially as described.

23. In a device of the character indicated, a hub shell interiorly provided with a positive clutch device, a driver sleeve for said shell received therein, a clutch sleeve received in said shell in sliding and driven relation with said driver sleeve and carrying a positive clutch device for coöperation with the device of said shell and also carrying a non-positive clutch device, a clutch block in non-rotatable and slidable relation with said shell and carrying a non-positive clutch device for coöperation with said first named non-positive clutch device, the characters of said non-positive clutch devices being such that when driving force is being transmitted from the one to the other the clutch sleeve tends to slide said clutch block, and means for normally preventing the sliding of said block and yieldable under a predetermined driving force to permit sliding, said positive clutch devices and said non-positive clutch devices being so spaced in the direction of said sliding that when said non-positive clutch devices are engaged and said means is preventing sliding of said block said positive clutch devices are unengaged and when said means yields under the tendency of the driving force to slide said block and said block slides said positive clutch devices are brought into engagement; substantially as described.

24. In a device of the character indicated, a hub shell interiorly provided with clutch teeth, a driver sleeve for said hub shell received therein, a clutch sleeve received in said shell in sliding and driven relation with said driver sleeve and carrying clutch teeth for coöperation with the teeth of said shell and also carrying a clutch taper, a clutch block in non-rotatable and slidable relation with said shell and carrying a clutch taper for coöperation with said first named taper, and means for normally preventing the sliding of said block and yieldable under a predetermined driving force to permit sliding, said tapers and said teeth being so spaced in the direction of said sliding that when said tapers are engaged and said means is preventing sliding of said block said teeth are unengaged and when said means yields under the driving force between said tapers and said block slides said teeth are brought into engagement; substantially as described.

25. In a device of the character indicated, a driven member carrying clutch teeth, a driver member for said driven member, a clutch element in sliding and driven relation with said driver member and carrying clutch teeth for coöperation with the first named teeth and also carrying a clutch taper, a clutch element in non-rotatable and sliding relation with said driven member and carrying a clutch taper for coöperation with said first named taper, and means for normally preventing the sliding of said second named clutch element and yieldable under a predetermined driving force to permit sliding, said tapers and said teeth being so spaced in the direction of said sliding that when said tapers are engaged and said means is preventing sliding of said second named clutch element said teeth are unengaged and when said means yields under the driving force between said tapers and said second named clutch element slides said teeth are brought into engagement; substantially as described.

In testimony whereof, I hereunto affix my signature, in the presence of two witnesses.

VICTOR W. PAGÉ.

Witnesses:
HAROLD A. KINGSBURY,
CHAS. T. TREADWAY.